(No Model.) 2 Sheets—Sheet 2.
E. KIPPER.
METHOD OF PRESSING AND MOLDING ARTICLES OF PLASTIC MATERIAL.
No. 335,526. Patented Feb. 2, 1886.
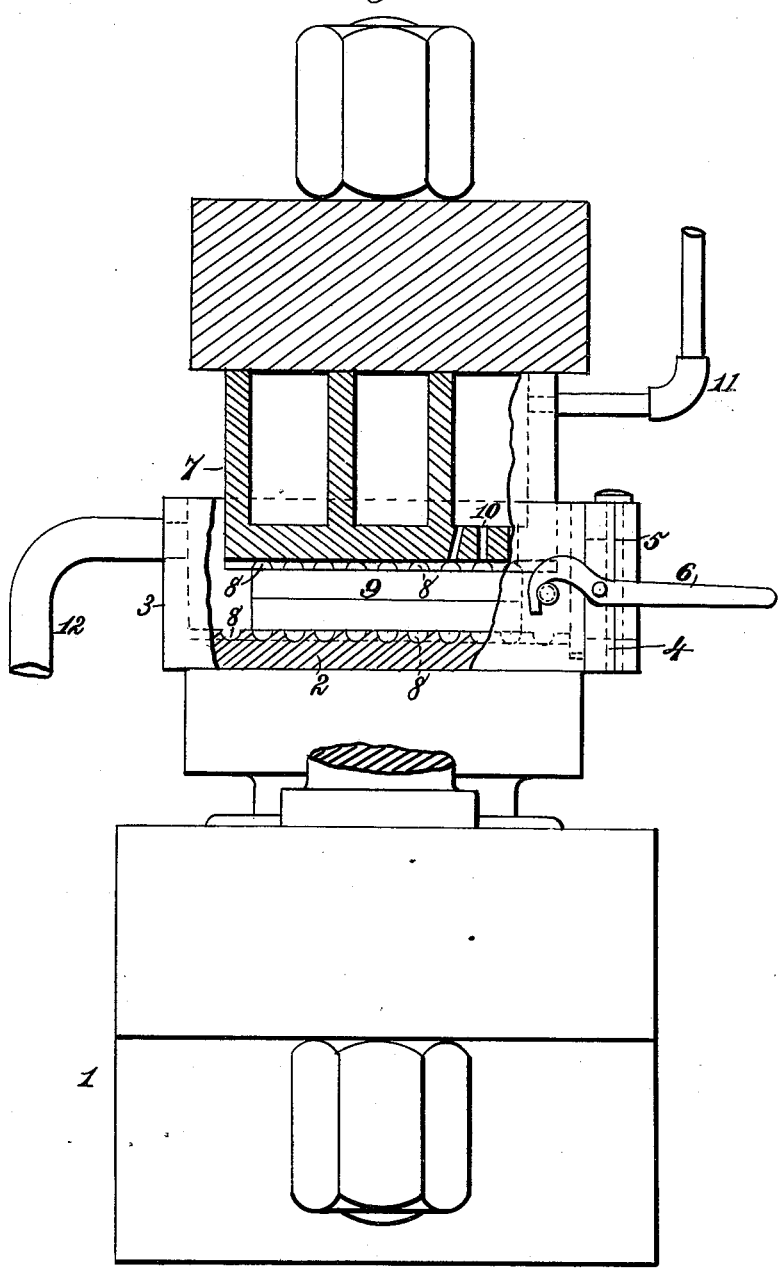
Witnesses.
Robert Everett
Geo. W. Rea
Inventor.
Emil Kipper.
By James L. Norris.

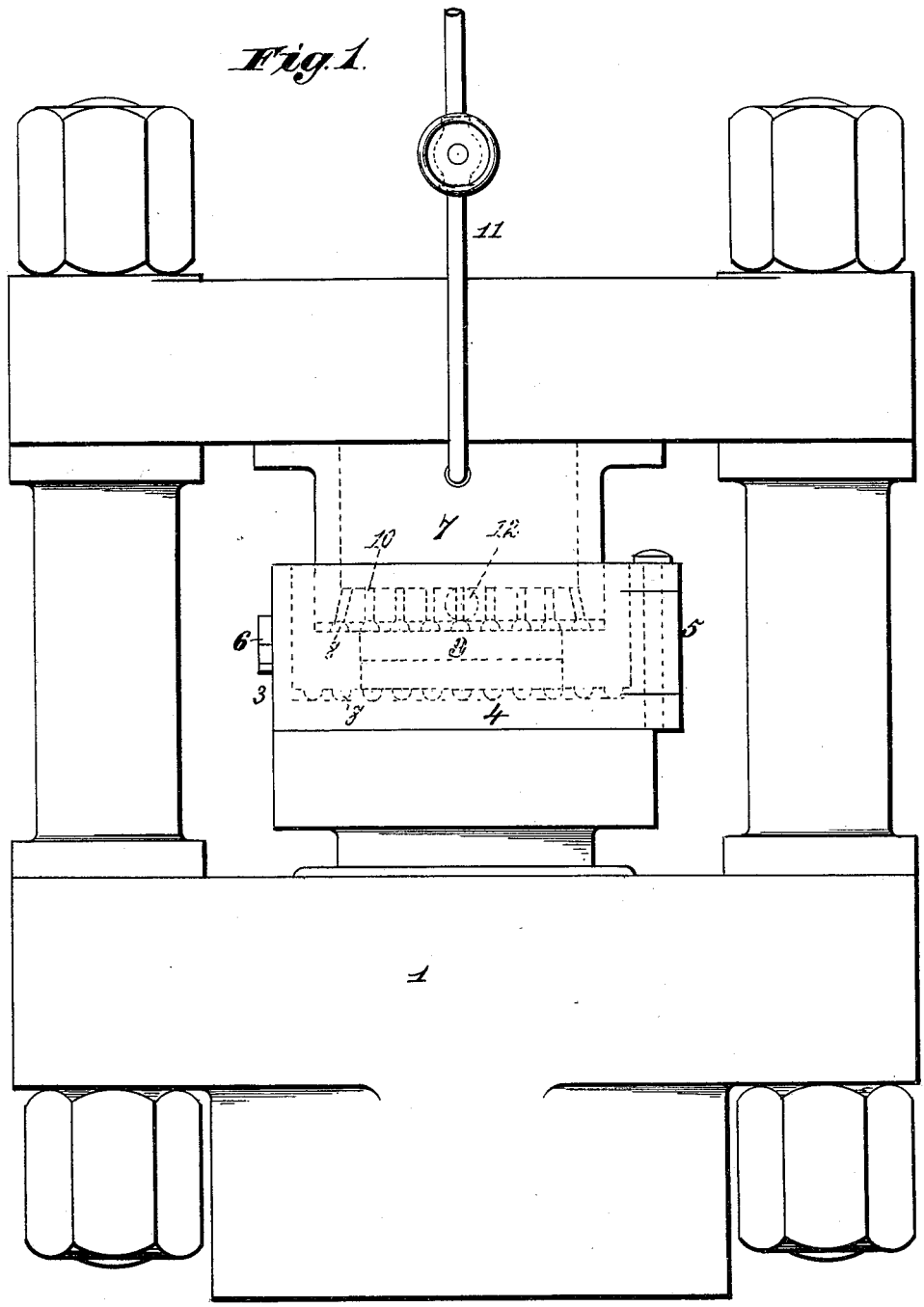

United States Patent Office.

EMIL KIPPER, OF ADAMS, MASSACHUSETTS.

METHOD OF PRESSING AND MOLDING ARTICLES OF PLASTIC MATERIAL.

SPECIFICATION forming part of Letters Patent No. 335,526, dated February 2, 1886.

Application filed September 4, 1883. Serial No. 105,543. (No model.)

*To all whom it may concern:*

Be it known that I, EMIL KIPPER, a subject of the King of Prussia, residing at Adams, in the county of Berkshire and State of Massachusetts, have invented new and useful Improvements in Methods of Pressing and Molding Articles of Plastic Material, of which the following is a specification.

This invention relates to the manufacture of articles from pyroxyline compounds and other plastic materials.

The method heretofore largely practiced in molding pyroxyline material into combs and other articles is to interpose a non-conducting material between the compound and the die or mold, and for this purpose papyrine or parchment-paper has been successfully employed, such interposed paper graduating the transmission of heat from the metal of the die or mold to the pyroxyline compound, permitting heat to pass, but not too rapidly, thus preventing injury to the comb or other blank. This method occupies considerable time, and is expensive by the use of parchment, which it is very desirable to avoid.

The objects of my invention are to protect the pyroxyline compound from injurious heating, to avoid the necessity of using non-conducting material between the compound and the metal of the die, and to enable the attendant, with the same number of dies or molds and with one and the same press and in the same period of time, to mold thrice the number of articles, as compared with the ordinary methods. These objects I accomplish in the manner hereinafter described and claimed, reference being made to the accompanying drawings, in which—

Figure 1 is a front elevation of an apparatus constructed by me for carrying my invention into practice, and Fig. 2 an end elevation of the same, partly in section.

In order to enable those skilled in the art to practice my invention, I will now describe the same in detail, referring to the drawings, where—

The number 1 indicates the foundation or base of the apparatus, supporting the rising and falling press-box, which comprises a horizontal bottom wall, 2, and vertical side and end walls, 3 and 4, one of the latter being hinged at its end, as at 5, and provided at the other end with a fastening device, 6, of any suitable construction, for holding such hinged wall in its closed position, the object of the hinged portion being to provide for conveniently introducing and removing the dies or molds to be subjected to pressure.

The inner surface of the bottom wall, 2, of the press-box and the lower surface of the plunger 7 are each constructed or provided with a series of longitudinal and transverse intersecting grooves, channels, or corrugations, 8, in such manner that while the die or mold 9 is subjected to pressure a stream of cold water can be caused to flow about all the sides of such die or mold, for quickly cooling the same, as hereinafter explained. The plunger 7 is chambered and provided in its bottom wall, at one end portion, with a series of perforations, 10, and with the chambered part of the plunger having the said perforations is connected one end of a water supply pipe, 11, having a stop-cock, while with the upper portion of the press-box is connected one end of a water-discharge pipe, 12, whereby a stream or body of water can be passed through the plunger into the press-box and discharged therefrom.

In order to clearly distinguish my invention from the method ordinarily practiced in molding articles from pyroxyline compounds and other plastic material, I will first briefly explain such ordinary method. The plastic material or blank is placed in a die or mold, which is then placed between two steam-heated plates in a suitably-constructed press, steam being supplied to such plates for gradually heating the die or mold. The pressure is applied by the rising and falling press-box and plunger until the plastic mass or blank, yielding under the influence of the heat and pressure, assumes the desired shape, after which the steam inlet is closed and cold water is introduced into the steam-chamber in the heated plates, and the die or mold thus cooled until the plastic compound is sufficiently hardened to permit its removal from the die. This indirect mode of heating and cooling by contact of the die or mold with the external surface of the steam-plates injuriously affects the plastic compound, and to avoid this it was found necessary to employ the non-conducting paper lining, as hereinbefore mentioned; but a more serious objection resides in the fact that the indirect heating and cooling of the die or mold by contact with the aforesaid plates occupies much time and renders it impossible to rapidly introduce and remove the dies or molds, thus materially increasing the cost of manufacturing articles from pyroxyline compounds and other plastic compounds.

According to my improved method, I heat the pyroxyline compound by immersion in hot water or otherwise, at the same time separately heating the die to a suitable temperature, and when the compound is sufficiently plastic or soft for molding purposes I introduce such heated compound into the heated die, and place the latter in the press-box and apply the requisite pressure. When the desired impression is made, I introduce a stream of water through the water-inlet pipe 11, which flows through the perforations 10 of the plunger into the press-box and discharges therefrom through the outlet-pipe 12. The die or mold is of such size as to leave a clear space between its vertical sides and the vertical sides of the press-box, and this, in connection with the intersecting grooves, channels, or corrugations in the press-box and plunger, permits the water to reach and act directly upon all surfaces of the die or mold, thereby cooling the latter by direct contact with the flowing stream of cooling-liquid. While one die or mold is being pressed and cooled I prepare one or more dies or molds, as before explained, so that immediately on removing a die or mold from the press another is introduced thereinto, and thus the method is repeated. By the means set forth I am enabled to perfectly control the application of heat, which is of the greatest importance where pyroxyline compounds are used, and I can produce thrice the number of articles in a given period of time, as compared with the ordinary methods referred to.

I have shown the intersecting grooves or channels as formed in the press-box and plunger for permitting the cooling-fluid to flow around and come in contact with all parts of the die or mold; but obviously this can be effected by providing such grooves or channels in the dies or molds themselves.

Having thus described my invention, what I claim is—

1. The process herein described of manufacturing articles from pyroxyline and other plastic materials, which consists in first heating the material and the die outside of and apart from a press, then introducing the heated die into a press-box, then applying pressure, and finally introducing a body of water into the press-box into direct contact with the surfaces of the die or mold, substantially as described.

2. The process herein described of manufacturing articles from pyroxyline and other plastic compounds, which consists in first separately heating the material and a die outside of and apart from a press, then introducing such heated die and material into the press-box and applying pressure, and finally flowing a body of cooling-fluid through the press-box around and in direct contact with all the surfaces of the die, substantially as described.

In testimony whereof I have hereunto set my hand and seal in the presence of two subscribing witnesses.

EMIL KIPPER. [L. S.]

Witnesses:
RUSL. B. DEAN,
S. W. INGALLS.